Feb. 23, 1971  J. A. MRAZEK  3,565,543
PRESSURE BALANCED STARTER ROTOR
Filed April 2, 1969  2 Sheets-Sheet 1

INVENTOR
JAMES A. MRAZEK
BY Laurence A. Savoye
AGENT

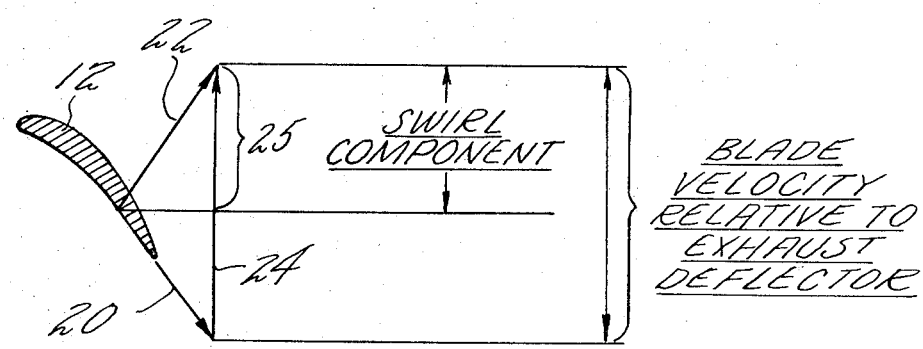
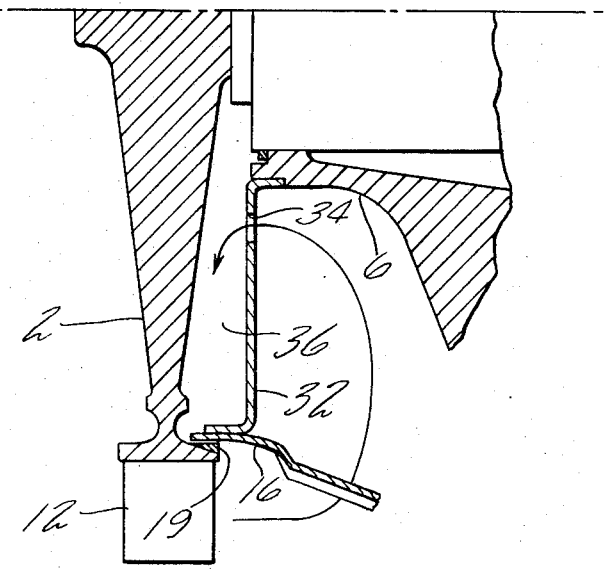

United States Patent Office 3,565,543
Patented Feb. 23, 1971

3,565,543
PRESSURE BALANCED STARTER ROTOR
James A. Mrazek, South Glastonbury, Conn., assignor to United Aircraft Corporation, East Hartford, Conn., a corporation of Delaware
Filed Apr. 2, 1969, Ser. No. 812,792
Int. Cl. F04d 29/66; F01d 25/12
U.S. Cl. 415—106
6 Claims

ABSTRACT OF THE DISCLOSURE

Scoops in the exhaust deflector of a gas turbine engine starter rotor are oriented so that at the free running condition of the starter rotor, the velocity head of the swirl component of the air leaving the rotor is converted into a pressure head which pressurizes the cavity on the back side of the rotor; the air is also caused to cool the rotor bearings.

BACKGROUND OF THE INVENTION

Field of the invention

This invention relates to gas turbine engine starters and particularly to pressure balanced starter rotors.

Description of the prior art

In the art it is known to balance compressor rotors and turbine rotors in a gas turbine engine, for example, with the high pressure exhaust of the compressor. Generally, a portion of the compressor exhaust gas is caused to impinge on the rotor disc face in such manner as to oppose the axial thrust loads acting thereon. However, this is undesirable from a compressor efficiency standpoint because it necessitates a bleed somewhere in the compressor. In the case of an engine starter, a compressed air source is utilized to furnish power for the starter turbine rotor. It is also undesirable to utilize any of the compressed air from that source to balance the rotor because it reduces the overall efficiency of the starter. Nevertheless pressure balancing of the starter rotor is necessary because in the free running condition, i.e., maximum rotor speed with minimum torque, the thrust forces generated at the rotor, the high speed of the rotor and the temperature on the rotor bearings substantially reduce the bearing life, and failure of the bearings renders the starter inoperative. I have found a way to pressure balance the starter rotor and cool the bearings without reducing the efficiency of the starter.

SUMMARY OF THE INVENTION

The object of the present invention is to provide a gas turbine starter rotor which is pressure balanced to offset the axial thrust load thereon and has bearings which are cooled by the same fluid utilized to pressure balance the rotor without reducing the efficiency of the starter in any manner whatsoever.

In accordance with the present invention a gas turbine starter rotor which is pressure balanced and having bearings which are cooled is provided by means which utilize the low pressure, high velocity turbine exhaust, normally waste gas which would be dumped to ambient, to pressurize the cavity behind the rotor so that the pressure force opposes the axial thrust load on the turbine rotor; this same turbine exhaust is used to cool the starter rotor bearings since the temperature of the turbine rotor exhaust air is lower than the ambient air temperature surrounding the gas turbine engine starter. The pressurization and bearing cooling are accomplished by providing scoops in the exhaust deflector disposed adjacent the downstream side of the turbine rotor. The scoops are oriented with respect to the rotor in such manner that at the free running condition, the velocity head of the swirl component is converted into pressure head. This pressure head or impact pressure pressurizes the cavity on the back side of the rotor which opposes the thrust force and, therefore, reduces the net thrust on the rotor and consequently the load on the bearings. Movement of the turbine exhaust air over the housing area cools the rotor support housing and, therefore, the bearings.

The foregoing and other objects, features and advantages of the present invention will become more apparent in light of the following detailed description of a preferred embodiment thereof, as illustrated in the accompanying drawings.

BRIEF DESCRIPTION OF THE DRAWINGS

FIG. 2 is a diagrammatic view of a starter rotor blade showing a velocity vector diagram for the air leaving the rotor blade.

FIG. 3 is a partial sectional elevation of a turbine starter rotor assembly in accordance with another embodiment of the present invention.

DESCRIPTION OF THE PREFERRED EMBODIMENT

Figure 1:
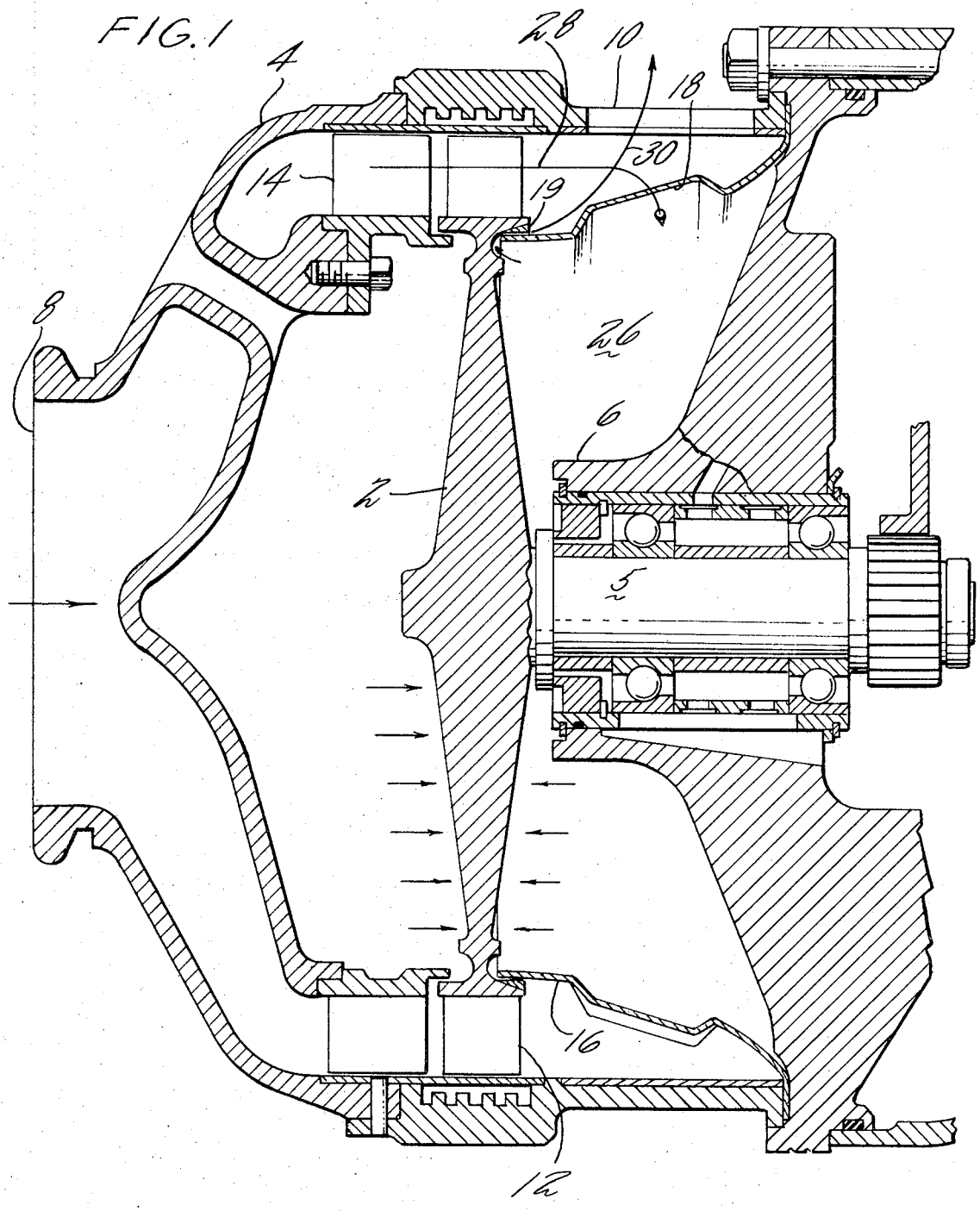
FIG. 1 is a sectioned elevation view of a turbine starter rotor assembly in accordance with the present invention.

Referring to FIG. 1, there is shown a turbine starter rotor 2 disposed within a housing 4 and having a shaft 5 rotatably mounted in bearing means 6. The housing 4 is provided with an inlet 8 and an outlet 10. The rotor 2 has blades 12 radially disposed thereon. Inlet guide vanes 14 may be provided adjacent the upstream side of the rotor blades. Disposed adjacent the downstream side of the rotor blades 12 is an exhaust deflector 16 which has scoop 18 therein. A clearance seal 19 is provided between the rotor and the deflector 16.

In operation air enters the turbine starter rotor housing 4 through the inlet 8, passes the inlet guide vanes 14, goes through the rotor blades 12 thereby turning through the outlet 10. When the rotor is in the free running condition, i.e., maximum rotor speed with no load on the rotor, the velocity diagram for air leaving a rotor blade 12 is as shown in FIG. 2. The arrow 20 represents the velocity of the air with respect to the rotor blade. The arrow 22 represents the absolute velocity of the air leaving the blade. The arrow 24 represents the velocity of the air with respect to the exhaust deflector 16 and the scoops 18. The portion of the arrow 24 denoted by bracket 25 is the swirl component. A portion of the swirl component of the air enters the chamber 26 on the downstream side of the rotor 2 through the scoops 18 as shown by the arrow 28. The velocity energy of this air is converted into a pressure head in the chamber 26 and, therefore, pressurizes the rotor disc, and thus opposes the reaction force on the rotor. The air entering through the scoops 18 also passes over the bearing means 6, thereby cooling the bearings. The air leaves the chamber 26 through a space between the exhaust deflector 16 and the clearance seal 19 as shown by the arrow 30 and proceeds to ambient through the housing outlet 10.

In FIG. 3 (wherein like numerals refer to like components) another embodiment is shown. An additional baffle 32 having a hole 34 therein is disposed between the exhaust deflector 16 and the bearing means 6 an optimum distance from the rotor 2 to induce optimum swirl in the newly created chamber 36. This swirl action increases the pressure at the outer periphery of the rotor disc. Higher pressures are generated in the chamber 36 due to the pumping action of the rotor.

There has thus been described a preferred embodiment of a pressure balanced turbine starter rotor in accordance with the present invention. It should be understood by those skilled in the art that various changes and omissions in the form and detail thereof may be made therein without departing from the spirit and scope of the invention, which is to be limited only as set forth in the following claims:

What I claim as new and desire to secure by Letter Patent of the United States is:

1. Apparatus for pressure balancing the rotor of a gas turbine said gas providing a cooling effect on the expansion thereof and cooling the bearings in which the turbine rotor shaft is rotatably supported, comprising:
   a housing having an inlet and an outlet;
   a turbine rotor having radially projecting blades thereon disposed in said housing and having a shaft;
   bearing means disposed in said housing for rotatably supporting said shaft; and
   exhaust deflector means disposed in said housing adjacent the downstream side of said blades, including means for admitting and converting a portion of the expanding exhaust gas from said turbine rotor into a chamber of said housing on the downstream side of said turbine rotor such that the kinetic energy of that portion of the gas on the downstream side of said turbine rotor in converted to pressure energy whereby the pressure energy opposes the axial thrust forces acting on said turbine rotor and thereby reduces the load and cools said bearings.

2. Apparatus for pressure balancing the rotor of a gas turbine as recited in claim 1, additionally comprising: means for passing that portion of the exhaust gas from said turbine rotor which enters the housing on the downstream side of said turbine rotor over said bearing means, whereby said bearing means are cooled.

3. Apparatus for pressure balancing the rotor of a gas turbine as recited in claim 1, wherein said exhaust deflector means comprises: an annular ring having a scoop disposed therein oriented with respect to the rotor blades such that at the free running condition of the rotor, the velocity head of the swirl component is converted into a pressure head on the downstream side of the rotor disc.

4. Apparatus for pressure balancing the rotor of a gas turbine as recited in claim 3, additionally comprising: means for passing the portion of the rotor exhaust gas which is the pressure head on the downstream side of the rotor disc over said bearing means, whereby said bearing means are cooled.

5. Apparatus for pressure balancing the rotor of a gas turbine and for cooling the bearings in which the turbine rotor shaft is rotatably disposed as recited in claim 1, additionally comprising: baffle means disposed downstream of said rotor and spaced therefrom such that a chamber is formed therebetween, said baffle means having a hole therein for admitting air into said chamber whereby swirl is induced within said chamber and thereby the pressure on the rotor disc is increased.

6. Apparatus for pressure balancing the rotor of a gas turbine and for cooling the bearings in which the turbine rotor shaft is rotatably disposed as recited in claim 3, additionally comprising: baffle means disposed downstream of said rotor and spaced therefrom such that a chamber is formed therebetween, said baffle means having a hole therein for admitting air into said chamber whereby swirl is induced within said chamber and thereby the pressure on the rotor disc is increased.

References Cited

UNITED STATES PATENTS

| 2,410,769 | 11/1946 | Baumann | 230—122 |

FOREIGN PATENTS

| 586,569 | 3/1947 | Great Britain | 415—180 |
| 214,463 | 7/1941 | Switzerland | 415—106 |

HENRY F. RADUAZO, Primary Examiner

U.S. Cl. X.R.

415—107, 180, 503